United States Patent [19]

Kizler et al.

[11] 4,359,893
[45] Nov. 23, 1982

[54] VOLTAGE SOURCE FOR ION CURRENT MEASUREMENT IN AN INTERNAL COMBUSTION ENGINE

[75] Inventors: Alfred Kizler, Stuttgart; Günter Schirmer, Ingersheim, both of Fed. Rep. of Germany

[73] Assignee: Robert Bosch GmbH, Stuttgart, Fed. Rep. of Germany

[21] Appl. No.: 234,930

[22] Filed: Feb. 17, 1981

[30] Foreign Application Priority Data

Feb. 22, 1980 [DE] Fed. Rep. of Germany ....... 3006665

[51] Int. Cl.³ ............................................ G01M 15/00
[52] U.S. Cl. ....................................... 73/115; 73/116; 324/460
[58] Field of Search .................... 73/115, 116, 35, 753; 324/460

[56] References Cited

U.S. PATENT DOCUMENTS 3,168,695  2/1965  Fales ................................... 324/460
4,232,545 11/1980  Dobler et al. .......................... 73/35
4,307,603 12/1981  Dobler et al. ......................... 73/115
4,312,215  1/1982  Dobler et al. ......................... 73/115

Primary Examiner—Donald O. Woodiel
Attorney, Agent, or Firm—Frishauf, Holtz, Goodman & Woodward

[57] ABSTRACT

A voltage source for measurement of pressure fluctuations in internal combustion engine cylinders by current detected between the electrodes of the sparkplug after the spark has died down, is derived from the ignition voltage. A capacitor can be charged to a voltage of a few hundred volts for this purpose in various ways, and either a positive or a negative measurement voltage can be provided with respect to ground across a measuring resistor for further processing. Very few additional components are required. It is possible to provide a voltage that is continuously available for the convenience of timing the measurement and for the capability of making the measurement and all of the cylinders of the engine.

18 Claims, 10 Drawing Figures

VOLTAGE SOURCE FOR ION CURRENT MEASUREMENT IN AN INTERNAL COMBUSTION ENGINE

This invention concerns systems for detecting pressure fluctuations in the combustion chamber of an internal combustion engine by means of an ion current electrode exposed to the gas in the combustion chamber, and more particularly with the provision of a voltage source for measuring the ion current. The engine sparkplug itself may provide ion-current electrodes.

If voltages higher than the battery voltage are necessary in a motor vehicle, it is common to obtain for these voltages, a supplementary battery. These batteries have the disadvantage that they take up a great deal of space and because of their size also have a large capacitance with respect to the surroundings or ground, so that the frequency of about 10 kHz appearing in ion current measurement no longer can be transmitted. Furthermore, such batteries require regular maintenance, because an acid leak from a storage battery can damage or destroy the entire battery mounting.

It is also known to provide electronic converters for the provision of higher voltages. Such converters chop up the direct voltage provided by the vehicle battery to produce an alternating current that is then raised in voltage by a transformer. The raised alternating voltage is then rectified back into a direct current. The component expense in such circuits is very high and, furthermore, the converter must have low capacitance on its output side, because otherwise in the necessary ground-free ("floating") operation of the voltage source for ion current, a measuring frequency of about 10 kHz can no longer be transmitted in the measuring circuit. In addition, particular blocking components must sufficiently damp the operating frequency of the converter.

THE INVENTION

It is an object of the present invention to provide a more convenient, efficient and inexpensive voltage source for ion current measurements in an internal combustion engine. Such a voltage source should be able to deliver several hundred volts and must have low capacitance to ground in order to operate ungrounded in a circuit for signals of frequencies of the order of 10 kHz.

Briefly, a high voltage source is provided by deriving voltage from the high voltage engine ignition circuits of the vehicle. For example, an element such as a varistor or a Zener diode can be interposed between the ignition coil and a sparkplug of an engine, with a capacitor in circuit therewith, to charge up to the voltage-drop voltage and serve as a source of that voltage for ion current measurement. The capacitor can conveniently be connected in parallel with the constant voltage element. The capacitor can be associated with diodes to change the effective polarity of the voltage source.

For use of high voltage potential derived from the engine ignition circuit, few additional components are necessary to provide voltage for the ion current measurement, and the voltage source for the measurement can be ungrounded and of low internal impedance up to frequencies from about 10 kHz. By the additional diode arrangement just mentioned, either a positive or a negative measuring current can be obtained so as to make the measuring circuit suitable to a following evaluation circuit.

When the engine ignition system utilizes an auxiliary spark device between the distributor and a sparkplug, the voltage drop across the auxiliary spark device can be applied to a capacitive voltage divider, so that the voltage across one of its capacitors can be used as the source of voltage for measurement, thus using an already present auxiliary spark gap for voltage generation. Here again, it is possible to obtain a reversal of the polarity of the measurement voltage and currents by means of additional diodes in the voltage supply. The auxiliary spark gap can be provided in the engine ignition system between distributor and sparkplug, as well as between ignition coil and sparkplug. In the latter case, there is the advantage that the capacitor is charged with every spark pulse, so that in the case of multicylinder engines, ion current measurement is possible in every cylinder.

Another possibility made available by the invention is to pick off a voltage between the primary winding of the ignition coil and the interruptor contact, and to lead it through a peak value rectifier to a capacitor serving for voltage storage. Thus, the voltage across that capacitor can be utilized as a potential source for the measurement. This arrangement has the advantage that the capacitor voltage almost always remains the same and is newly charged up by every spark pulse, so that the voltage necessary for measurement is continuously available. That has the further advantage that the moment at which the measurement is made can be selected without limitation. In this circuit, also measurement of the ion current in every cylinder of a multicylinder engine can be performed in a particularly simple manner. Here also, the direction of flow of the measuring current can be reversed by a suitable diode network.

In still another embodiment for deriving the measurement voltage, an additional (third) winding is provided in the ignition coil, the output voltage of which is rectified and smoothed and then serves for charging a storage capacitor. The voltage present across the capacitor serves as the measuring voltage. This circuit has the advantage that it is completely separated galvanically from the ignition system and also can be constituted with very few additional components. The polarity of the measuring voltage can be set by the polarity of the rectifying diode.

Finally, there is also the possibility to connect a transformer between the primary winding of an ignition coil and the interruptor contact and then to rectify and smooth the output voltage of the secondary of that transformer and supply the voltage to a storage capacitor. This has the same advantages as in the circuit just previously described and the further advantage that the usual ignition coil does not need to be modified. Again, by the choice of diode polarity, the polarity of measuring voltage is selectable.

THE DRAWINGS

The invention is further described by way of illustrative examples with reference to the annexed drawings, in which.

DESCRIPTION OF THE ILLUSTRATED EMBODIMENTS

Figure 1:
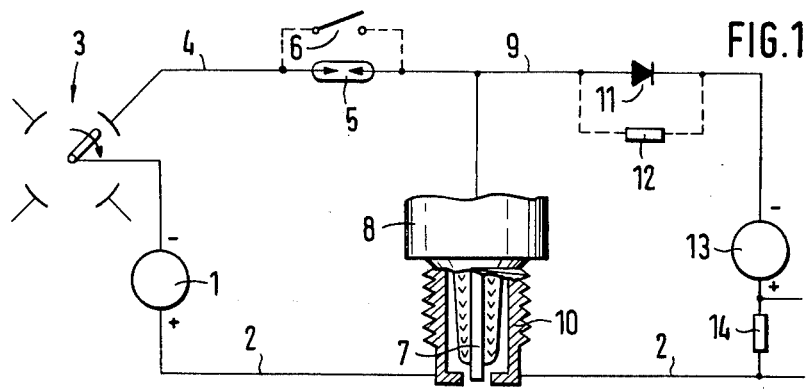
FIG. 1 illustrates an installation for measuring pressure fluctuations in the combustion chamber of an internal combustion engine by means of an ion current electrode exposed to the gas in the combustion chamber.

FIG. 1 schematically shows an installation for detecting pressure fluctuations in combustion chambers of an internal combustion engine, such as is disclosed in detail in German patent application No. 28 02 202 and in the corresponding copending U.S. application Ser. No. 002,478, filed Oct. 1, 1979, now U.S. Pat. No. 4,232,545, owned by the same assignee as the present application. An ignition voltage source 1 has a positive pole connected to the common ground conductor 2, while its negative pole is connected to the distributor arm of a spark distributor 3. A conductor 4 leads from one of the distributor terminals to an auxiliary spark gap 5, which can also be dispensed with as indicated by the switch 6 connected to the circuit in broken lines. The other side of the auxiliary spark gap 5 or of the switch 6 leads to the central electrode 7 of the sparkplug 8. The sparkplug circuit is then completed by the connection of the plug casing 10 with the common ground conductor 2. The measuring circuit for the ion current branches off by the conductor 9 connected between the auxiliary gap 5 and the sparkplug 8. For separation of the measuring circuit and the ignition voltage circuit, a diode 11 poled in the direction of the ion current flow is provided, or a high value protective resistance 12 may be provided instead of the diode, as indicated by broken lines. A measuring voltage source 13 is connected in series with the diode 11 or the protective resistor 12. Here the negative pole of the voltage source goes to the central electrode 7 of the sparkplug 8 via the conductor 9, whereas the positive pole is connected through a measuring resistance 14 with the ground conductor 2. The measurement voltage can be picked off from the measuring resistance 14. In this arrangement, the ion current that is measured between the electrodes 7 and 10 is measured in the cylinder served by the sparkplug 8 after the ignition operation has been performed. By means of the diode 11 or the resistance 12, an excessive loading of the ignition circuit is prevented without affecting the measurement results.

Figure 2:
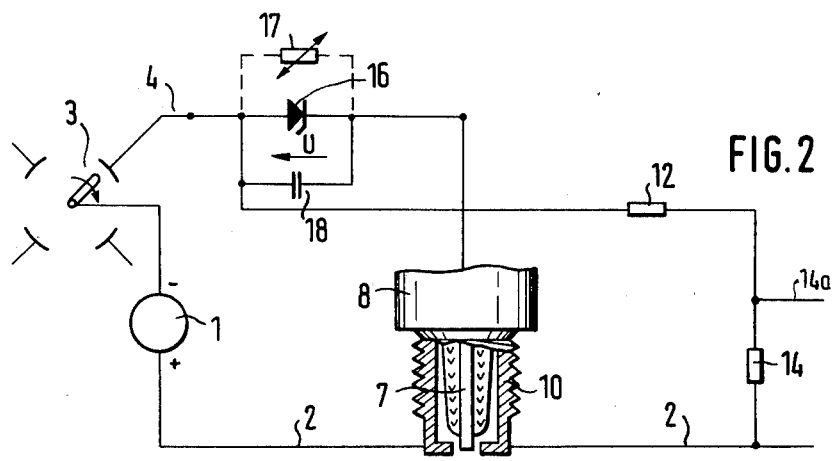
FIG. 2 is a first embodiment of a voltage source for a measurement circuit of the kind of FIG. 1 utilizing a constant voltage drop element between distributor and sparkplug of the engine.

FIG. 2 shows a first embodiment illustrating how a measuring voltage for ion current measurement can be obtained from the ignition current of the secondary side of an ignition coil. As in FIG. 1, here also the positive pole of the ignition voltage source 1 is connected with the common ground conductor 2, while the negative pole is connected to the distributor arm of the ignition distributor 3. The voltage proceeds from the distributor over the conductor 4 to a Zener diode 16 or a varistor 17, the possible substitution of the latter being indicated by broken lines. A capacitor 8 is connected in parallel to the Zener diode 16 or the varistor 17 and is charged up to the voltage across the Zener diode or the varistor. The other terminal of the Zener diode 16 or varistor 17 is connected with the central electrode 7 of the sparkplug 8, while the sparkplug casing 10 is connected with the ground conductor 2. A protective resistor 12 is connected on the distributor side of the capacitor 18. The other end of the protective resistor 12 is connected to the measuring resistance 14 which completes the measuring circuit by its connection to the ground conductor 2.

The capacitor 18 is charged by the ignition current to a voltage that is set by the Zener diode 16 or the varistor 18. Galvanic separation of the ignition voltage source 1 is performed in the case of multicylinder engines by the distributor 3, whereas in the case of engines operating without a distributor, a supplementary auxiliary spark gap (not shown in FIG. 2) is to be provided. The resulting voltage U across the capacitor 18 is normally positive in the case of conventional negative ignition voltage, i.e. the measuring current flows across the ionized space between the central electrode 7 and the sparkplug casing 10 to the measuring resistor 14 and then through the high-value protective resistance 12 back to the capacitor 18. This is in contrast to the flow of measuring current in FIG. 1 from the source 13 through the measuring resistor 14 across the ionized gap to the electrode 7 and then back to the source 13 through the diode 11 or the protective resistor 12. Measured voltage can be taken off the measuring resistance 14 (as shown by the connection line 14a going off to the right in FIG. 2 to a measuring instrument or an evaluation circuit (not shown). The value of the protective resistor 12 is so high that the ignition voltage source is not appreciably influenced by the measuring circuit. In the circuit of FIG. 2, accordingly, the measurement of the ion current follows right after the termination of the ignition process.

Figure 3:
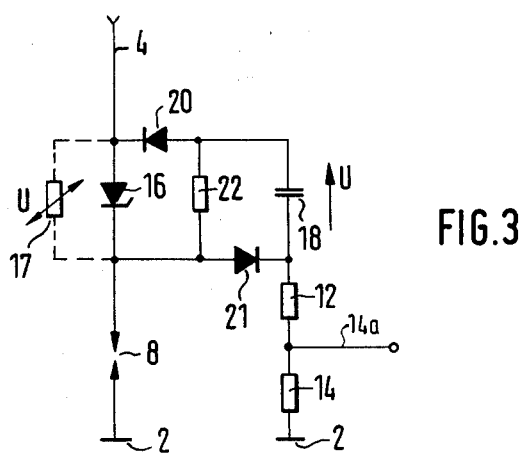
FIG. 3 is a modification of the circuit of FIG. 2 utilizing auxiliary diodes.

FIG. 3 shows a variant of FIG. 2 for providing a negative measurement voltage. The ignition voltage proceeds, through an ignition distributor not shown in the drawing, over the conductor 4 to the Zener diode 16 or the varistor 17. The other end of the Zener diode 16 or the varistor 17 leads to a schematically represented sparkplug 8, the plug casing of which is connected with the common ground capacitor 2. The capacitor 18 is in this case charged through the diodes 20 and 21. In order to make possible the flow of a measuring current, a resistor 22 is connected between capacitor 18 and diode 20 on the one hand, and the Zener diode 16 or varistor 17 and the sparkplug 8 on the other hand. Between the diode 21 and the capacitor 18, a tap conductor leads to the protective resistor 12 and the measuring resistor 14, the latter being also connected to the ground conductor.

During the charging phase, which is the period during which an ignition current flows, i.e. the duration of the ignition pulse, the charging current flows through the diodes 20 and 21 to the capacitor 18 and charges it up to the voltage set by the Zener diode 16 or the varistor 17. In the following measuring phase, the measuring current then flows over the protective resistor 12 and the measuring resistance 14 to the measuring path between the two sparkplug electrodes and then over the resistance 12 back to the capacitor 18. The direction of flow is thus exactly opposite to that in the above-described circuit of FIG. 2. The constitution of the evaluation circuit (not shown) connected to the conductor 14a determines which of the circuits of FIG. 2 and FIG. 3 is the better for the particular case. According to whether positive or negative signals are easier to evaluate, one or the other of these circuits will be chosen.

Figure 4:
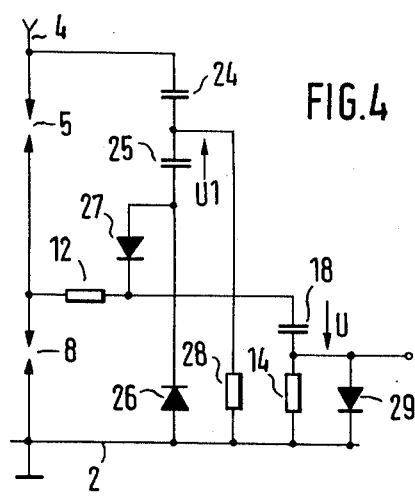
FIG. 4 is a second embodiment of a circuit providing a voltage source for measurement of ion current, in this case utilizing the voltage across an auxiliary spark gap.
Figure 5:
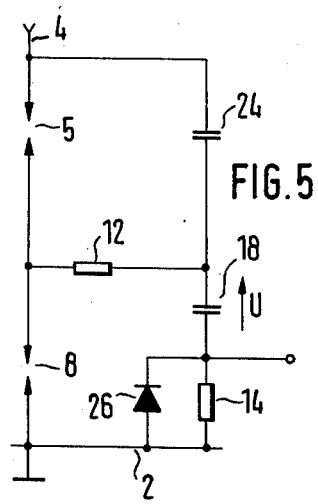
FIG. 5 is a simpler version of the circuit of FIG. 4.

In the circuits of FIGS. 4 and 5, the measuring voltage is obtained by capacitive division of the ignition voltage. These circuits are accordingly advantageously usable if an auxiliary spark gap 5 is provided of the kind already mentioned in connection with FIG. 1. The ignition voltage proceeds from a distributor (not shown) over the conductor 4 to the auxiliary gap 5, which passes on the ignition voltage to the schematically represented sparkplug 8. The plug casing is again connected with the common ground conductor 2. Branching off from the conductor 4 is a capacitive voltage divider composed of the capacitors 24 and 25, the latter being connected through the diode 26 with the common ground conductor 2. From the connection between the capacitor 25 and the diode 26, the diode 27 is branched off which has its cathode connected both on the one hand through the protective resistor 12 to the connection between the auxiliary gap 5 and the sparkplug 8 and, on the other hand, to one side of the capacitor 18. Between the other side of the capacitor 18 and the common ground conductor are then connected the measuring resistance 14 and the diode 29. Furthermore, from the common connection of the capacitors 24 and 25, a resistor 28 is connected leading to the common ground conductor 2.

The voltage $U_1$ built up across the capacitor 25, which corresponds to a part of the ignition voltage and is determined by the capacitance ratio of the capacitors 24 and 25, is utilized to charge the capacitor 18 through the diodes 27 and 29 and the resistor 28. At the capacitor 18, there is now the positive measuring voltage U that serves to measure the ion current. The measuring current flows through the protective resistor 12, the gap of the sparkplug 8 and finally the measuring resistance 14 to the capacitor 18. The measured voltage is again available across the measuring resistance. The auxiliary gap 5 prevents the discharge of the capacitor 25 through the diode 27, the protective resistor 12 and the capacitor 24.

FIG. 5 shows the same circuit principle as in FIG. 4, but for negative measurement voltage. Since the transfer of charge from a voltage divider capacitor is not necessary, this circuit is simpler than the circuit of FIG. 4. The ignition voltage, again proceeding from a distributor not shown in the figure, passes through the auxiliary gap 5 to the sparkplug 8 producing a current that returns by the common ground conductor 2. Going off from the conductor 4, the ignition voltage reaches the voltage divider formed by the capacitors 24 and 18. From the other end of the capacitor 18, the diode 26 and the measuring resistor 14 provide paths to the common ground conductor 2. The protective resistor 12 lies in a sort of bridge between the auxiliary gap 5 and the sparkplug 8 on the one hand and the capacitors 24 and 18 on the other.

The operation of the voltage source is the same as described with respect to FIG. 4, but the charge transfer from the capacitor 25 to the capacitor 18 of the previous figure is missing. The measuring voltage U is provided proportionately to the capacitance ratio of the capacitors and is in this case negative with respect to ground. The measuring current flows through the measuring resistor 14, the gap of the sparkplug 8 and finally through the protective resistor 12. The diode 26 is provided in order to make possible a rapid charge of the capacitor 18 while allowing the measuring current that flows in the opposite direction to flow through the resistor 14. A measuring signal proportional to the ion current is available across the measuring resistance 14 for connection to an evaluation circuit.

In the circuits according to FIGS. 2–5, the measuring voltage is built up every time with a spark pulse, and the storage capacitor is discharged after the measurement, so that the measuring voltage vanishes. If measurements are to be made on two or more cylinders of a multicylinder motor, the circuits in question should not be connected to the conductor 4, but to a point between the ignition voltage source 1 and the distributor arm of the distributor 3. The Zener diode 16 or the varistor 17 of the circuit of FIG. 2 or FIG. 3 is accordingly to be connected in such case between the ignition voltage source 1 and the distributor arm of the distributor 3. Also the auxiliary gap 5 in FIGS. 4 and 5 is in such case to be provided between the ignition voltage source 1 and the distributor arm of the distributor 3, or else an additional auxiliary gap is to be provided at this location. The circuit itself is in other respects to be organized in an equivalent manner. Since the voltage source lies in the measuring circuit, care should be taken that the measuring frequency can be passed by the voltage source. The voltage source must therefore have a low internal impedance to frequencies of about 10 kHz.

In the circuits above discussed, the measuring voltage is available only briefly after the ignition pulse, because the voltage is derived from the ignition current. The circuits discussed below are particularly suitable for cases in which the measuring voltage is desired to be continuously available.

Figure 6:
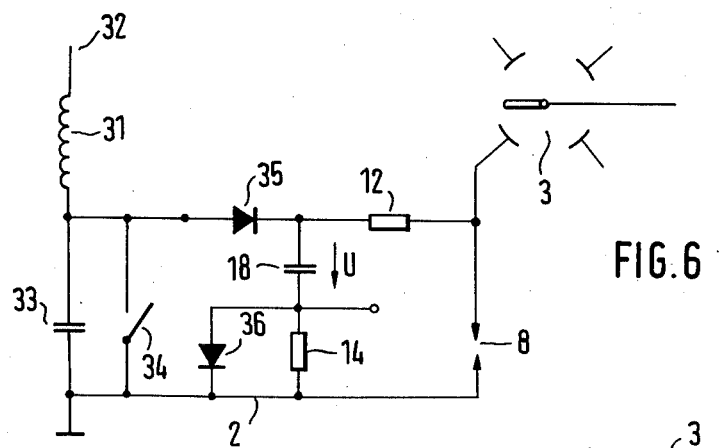
FIG. 6 is a circuit for deriving the measuring voltage from the voltage across the interruptor contacts in the primary circuit of the ignition coil.

In FIG. 6, the primary side of an ignition coil 31 is represented that has one end 32 connected to the battery voltage. The other end of the primary winding of the ignition coil 31 is connected through a parallel combination of an ignition capacitor 33 and an interruptor contact 34 with the ground conductor 2. Between the ignition coil 31 and the ignition capacitor 33, a diode 35 is connected having its cathode connected on the one hand with one end of the protective resistor 12 and on the other hand with the capacitor 18. The other end of the capacitor 18 is connected over the diode 36 and the measuring resistor 14 to the common ground conductor 2. The other end of the protective resistor 12 is connected on the one hand with the distributor 3 and on the other with the sparkplug 8, the other end of the sparkplug 8 being connected to the common ground conductor.

The positive pulse at the primary side of the ignition coil 31 serves to charge the storage capacitor 18 through the peak rectifier circuit formed by the diodes 35 and 36. Energized by the ignition capacitor 33, the LC circuit formed by the ignition coil 31 and the capacitor 33 produces voltages of more than 350 volts. The capacitor 18 is charged with this voltage. The diodes 35 and 36 on the one hand provide a quick charging of the capacitor and, on the other, prevent its discharge when the interruptor contacts 34 are closed. Once the capacitor 18 is charged, only the voltage that is lost as the result of the measuring current needs to be replaced. Hence, only the peaks of the voltage pulses are needed for charging, since the capacitor 18 barely discharges because of the high ohm value of the measuring circuit, so that the ignition voltage source is hardly loaded at all. The measuring current flows through the protective resistor 12 and the gap of the sparkplug 8, as well as the resistor 14 to the capacitor 18. The measurement voltage is again available at the measurement resistor 14. The moment of measurement can now be determined in a freely selectable manner by a following evaluation circuit (not shown), since the measuring voltage is continuously present at the sparkplug 8. The circuit of FIG. 6 provides a positive measurement voltage.

Figure 7:
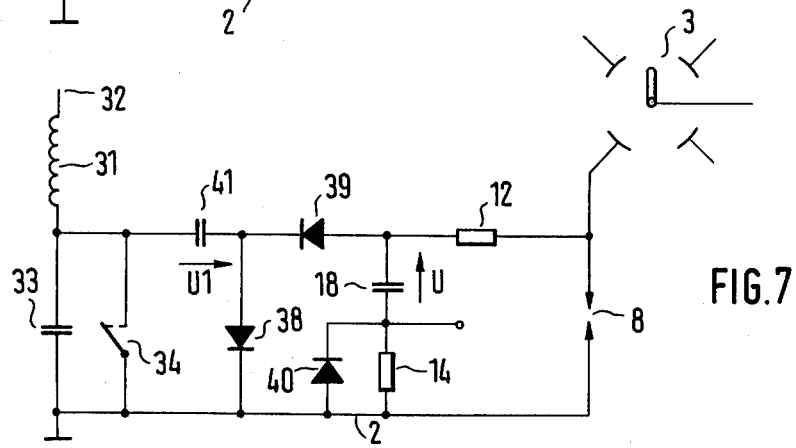
FIG. 7 is a modification of the circuit of FIG. 6.

The same circuit is shown in FIG. 7 for a negative measurement voltage. As in FIG. 6, the point 32 is connected with the voltage of a battery that is not shown. The primary winding of the ignition coil 31 is connected there, at the other end of which a parallel combination of the ignition capacitor 33 and the interruptor 34 is connected which is also connected to the ground conductor 2. The capacitor 14 is connected to the junction of the ignition coil 31 and the ignition capacitor 35 and its other end is connected to the diodes 38 and 39. The diode 38 is connected to the ground conductor 2, whereas the diode 39 is connected on the one hand to the capacitor 38 and, on the other, to the protective resistor 12. The other end of the capacitor 18 is connected over the diode 40 and also over the measuring resistance 14 to the ground conductor 2. The protective resistor 12 is connected to the sparkplug 8, the plug casing of which is connected to the ground conductor 2 and the central electrode of which is connected to the distributor 3.

Figure 8:
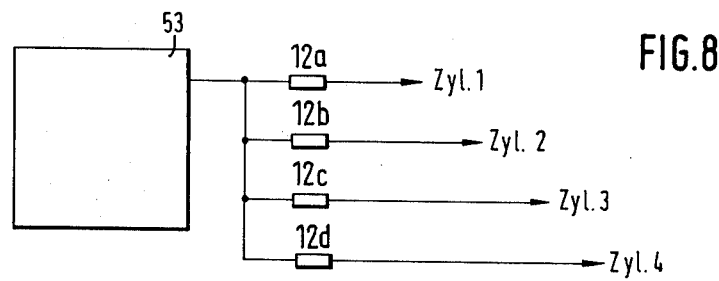
FIG. 8 is a diagram illustrating the use of a voltage source according to the invention for measurement of the ion current in all the cylinders of a multicylinder engine.

The manner of operation of the circuit of FIG. 7 is in principle the same as that of FIG. 6. A negative measurement voltage is provided, however. The capacitor 41 is charged through the peak rectifier 38 after which the charge is transferred to the capacitor 18 by means of the diodes 39 and 40. The measurement current, for which the capacitor 18 serves as voltage source, flows through the measuring resistor 14 and the sparkplug 8 to the protective resistor 12, which is connected to the capacitor 18. The circuit has the same advantages as that of FIG. 6. If measurements are to be made in two or more cylinders of an engine by circuits according to FIG. 6 or FIG. 7, the individual sparkplugs in the cylinder must each be connected with the measuring voltage source through an individual protective resistor. Such an arrangement is illustrated in FIG. 8. The resistors 12a to 12d respectively lead to the sparkplugs 8 of the individual cylinders, in the illustrated case, for example, the cylinders of a four-cylinder engine. The other side of the protective resistors are connected together and to the measuring voltage source 53, which represents a source provided in the manner of FIG. 6 or in the manner of FIG. 7.

Figure 9:
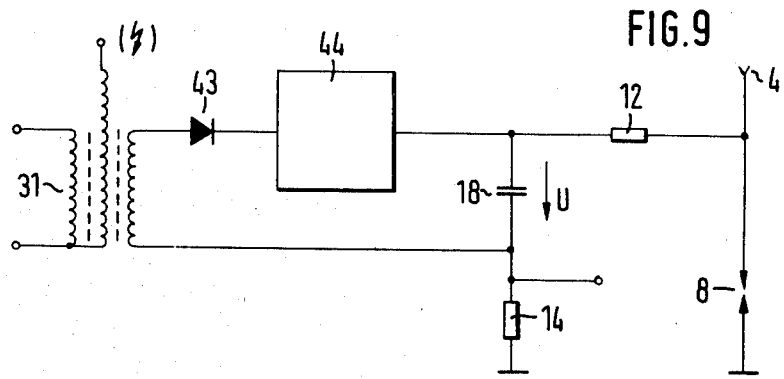
FIG. 9 is a circuit for deriving the measuring voltage from an additional winding of the ignition coil of an engine.

FIG. 9 shows a further possibility for producing a measuring voltage according to the invention. The ignition coil 31 in this case has, in addition to its primary and secondary winding, a third winding in which the measuring voltage is induced. This measuring voltage, which is dependent upon the number of turns of the third winding, is rectified by a rectifier 43 and smoothed by a filter 44. The smoothing filter can, for example, be constituted as an RC or an LC filter. The capacitor 18 is charged with the d.c. voltage thus produced, being connected on the one hand with the output of the filter 44 and on the other with the third winding of the ignition coil. The measuring current flows through the protective resistor 12, the sparkplug 8 and the measuring resistor 14. The direction of the measuring current is determined by the polarity of the diode 43. This diode can be reversed in polarity if the measuring current intended to flow in the other direction. The conductor 4 again leads to the ignition distributor 3 that is not shown in this figure.

Figure 10:
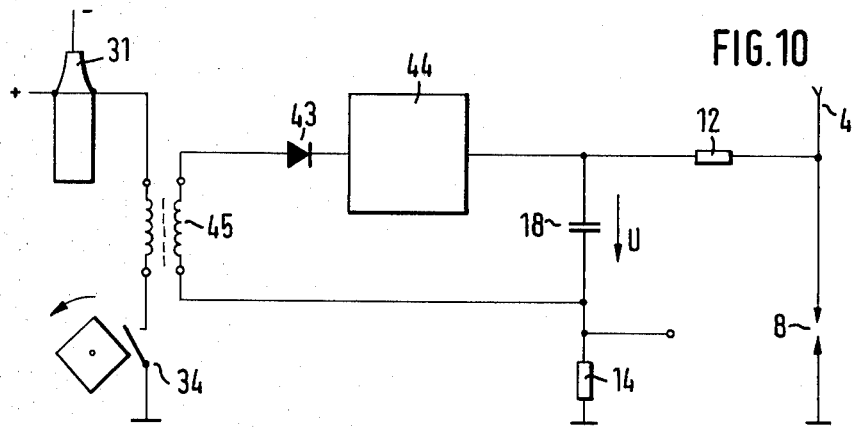
FIG. 10 is a circuit for deriving the measuring voltage from an additional transformer of which the primary winding is interposed between the interruptor and the ignition coil primary.

Instead of providing a third winding for the ignition coil 31, it is also possible to interpose a transformer 45 between the primary winding of the ignition coil 31 and the interruptor contact 34, as shown in FIG. 10. The primary winding of this transformer 45 is connected between the ignition coil 31 and the interruptor contact 34 and the voltage induced in the secondary winding of the transformer, the magnitude of which depends upon the turns ratio of the transformer, is, again, rectified by the diode 43 and smoothed in the filter 44. The d.c. voltage thus derived is stored in the capacitor 18. The capacitor 18 is connected between the smoothing filter and the other end of the secondary winding of the transformer 45. From this end, there is also connected the measuring resistor 14 that leads to the common ground conductor 2. From the junction of the smoothing filter 44 and the capacitor 18, a protective resistor 12 leads to the conductor 4 that, on the one hand leads to the distributor 3 (not shown) and, on the other hand, to the sparkplug 8. The measurement circuit is completed by the fact that the casing of the sparkplug 8 is connected to the common ground conductor 2. The manner of operation of this circuit is the same as that described for FIG. 9. The polarity of the diodes again determines the polarity of the measurement voltage.

The various circuits of the invention above described avoid the disadvantages of the known arrangements described in the previously known arrangements. In particular, the circuit of FIG. 6 is very simple in constitution and produces no disturbing voltages at the measuring terminal of the measurement resistors. The measuring voltage builds up only so long as the engine runs, i.e. so long as the ignition voltage is needed.

Although the invention has been described with reference to particular illustrative embodiments, it will be understood that further variations and modifications are possible within the inventive concept.

We claim:

1. A voltage supply circuit for measurement of pressure fluctuations in a combustion chamber of an internal combustion engine by reference to ion current, in the gas in said chamber comprising a constant voltage electrical element interposed in the connection line between the source of ignition high voltage and a spark plug, and a capacitor connected thereto so as to be charged to not more than said constant voltage, and means for applying the voltage charge of said capacitor to a circuit including a measuring resistor and an electrode in said combustion chamber disposed for detection of ion current.

2. A circuit as defined in claim 1, in which said electrode is the ungrounded electrode of said spark plug.

3. A circuit as defined in claim 1 or claim 2, in which said constant voltage element is a Zenor diode (16).

4. A circuit as defined in claim 1 or claim 2, in which said constant voltage element is a varistor (17).

5. A circuit as defined in claim 1 or claim 2, in which said capacitor (18) is connected in parallel to said constant voltage element (16, 17).

6. A circuit as defined in claim 1 or claim 2, in which, for determining the polarity of charge, said said capacitor (18) is connected at its respective terminals by diodes to the respective terminals of said constant voltage element, said diodes being poled so as to conduct during the charging of said capacitor.

7. A circuit for voltage supply for the measurement of pressure fluctuations in the combustion chamber of an internal combustion engine by measurement of ion current in the gas in said combustion chamber, comprising an auxiliary spark gap (5) connected in circuit between the ignition high voltage source (1) of the engine and a spark plug (8) and a capacitive voltage divider (24, 25; 24, 18) connected to a point in the ignition circuit between said auxiliary gap (5) and said high-voltage source (1), and means for providing the voltage across one capacitor (18, 25) of said divider to a measuring circuit comprising a measurement resistor and an ionized gap in said combustion chamber.

8. A circuit as defined in claim 7 in which said ionized gap is the spark plug gap.

9. A circuit as defined in claim 7 or claim 8, in which diodes (27, 29) are provided for transferring voltage of said capacitor (25) of said voltage divider to an additional capacitor (18).

10. A circuit as defined in claim 7 or claim 8, in which auxiliary gap (5) is interposed between said ignition high-voltage source (1) and the distributor (33) of the ignition circuit of said engine.

11. A circuit for voltage supply for the measurement of pressure fluctuations in the combustion chamber of an internal combustion engine by means of ion current in the gas of said combustion chamber, said engine having an ignition system containing an ignition coil having a primary winding and also containing an interruptor contact, said circuit comprising a peak voltage rectifier (35, 36; 35, 38) having its input connected to the electrical junction of said primary winding and said interruptor contact, a capacitor (18, 41) connected to the output of said peak voltage rectifier, and means for providing the charge voltage of said capacitor to a measuring circuit comprising a measuring resistor and an ionized path in said combustion chamber.

12. A circuit as defined in claim 11, in which said ionized path is a spark plug gap.

13. A circuit as defined in claim 11 or claim 12, in which diodes (39, 40) are provided and, also, an additional capacitor (18), whereby charge voltage of said capacitor connected to the output of said peak voltage rectifier is transferred to said additional capacitor (18) for supply therefrom to said measuring circuit.

14. A circuit as defined in claim 11 or claim 12, in which means for supplying the voltage of said capacitor connected to the output of said peak voltage rectifier of said measuring circuit includes a protective resistor, and in which said measuring circuit is constituted for measurement of conditions in a plurality of cylinders of said engine and includes an individual measuring resistor, an individual ionized path and an individual protective resistor (12a . . . 12b) for each cylinder.

15. A circuit for voltage supply for the measurement of pressure fluctuations in the combustion chamber of an internal combustion engine by means of ion current in the gas in said combustion chamber, said engine having an ignition coil, comprising an additional winding in said ignition coil (31), a rectifier (43) for rectifying the output voltage of said additional winding, a smoothing filter (44) connected to the output of said rectifier (43), a capacitor (18) connected for being charged through said rectifier and said smoothing filter and means for applying the charge voltage of said capacitor to a circuit comprising an ionized path in said combustion chamber and a measuring resistor.

16. A circuit as defined in claim 12, in which said ionized path is a spark plug gap.

17. A circuit for detection of pressure fluctuations in the combustion chamber of an internal combustion machine by means of ion current in the gas in said combustion chamber, said engine having an ignition coil (31) and an interruptor (34) connected in circuit with said ignition coil, comprising a transformer (45) having a primary winding connected between said ignition coil (31) and said interruptor (34) and a secondary winding, a rectifier (43) having its input connected to said secondary winding of said transformer (45), a smoothing filter (44) connected to the output of said rectifier, and a capacitor (18) connected for being charged by the output of said smoothing filter and means for applying the charge voltage of said capacitor to a measuring circuit including an ionized path in said combustion chamber and a measuring resistor.

18. A circuit as defined in claim 17, in which said ionized path is a spark plug gap.

* * * * *